May 10, 1932.  H. O. KUEHN  1,857,312

FISH LURE

Filed June 11, 1931

Inventor

Herman O. Kuehn

By S. E. Thomas

Attorney

Patented May 10, 1932

1,857,312

UNITED STATES PATENT OFFICE

HERMAN OTTO KUEHN, OF DETROIT, MICHIGAN

FISH LURE

Application filed June 11, 1931. Serial No. 543,651.

My invention relates to a fish lure shown in the accompanying drawings and more particularly described in the following specification and claims.

The primary object of the invention is to provide a lure adapted to attract the fish through its life-like movement in the water. In the present embodiment, the lure represents a frog, and the angler upon casting the same, reels or manipulates his line by slightly pulling and then releasing the same so as to cause its movable parts,—the legs of the frog,—due to the resistance of the water to move back and forth in a life-like manner, which in the instant invention has proven itself to be a very attractive lure for fish.

With the foregoing and other objects in view which will appear as the description proceeds, the invention further resides in the details of construction hereinafter described and claimed, it being understood that changes may be made in the precise embodiment of the invention herein disclosed without departing from the spirit of the same.

In the drawings accompanying this specification:

Referring now to the letters of reference placed upon the drawings:

A denotes the body of a frog lure, the upper portion of which is preferably constructed of wood, to provide buoyancy.

Figure 4:
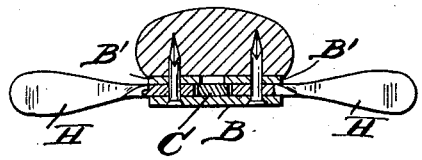
Figure 4 is a cross-sectional view, taken on or about line 4—4 of Figure 2.
Figure 5:
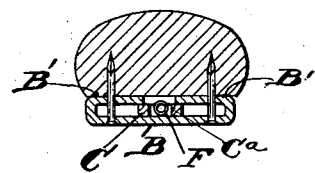
Figure 5 is another cross-sectional view taken on or about line 5—5 of Figure 2.

B denotes a sheet metal plate, preferably aluminum, having return bends $B^1$ $B^1$, overlapping the lower or body portion, but spaced therefrom,—as clearly indicated in Figures 4 and 5 of the drawings,—to receive a slidable slotted rack-bar C, extending longitudinally through the device.

Figure 1:
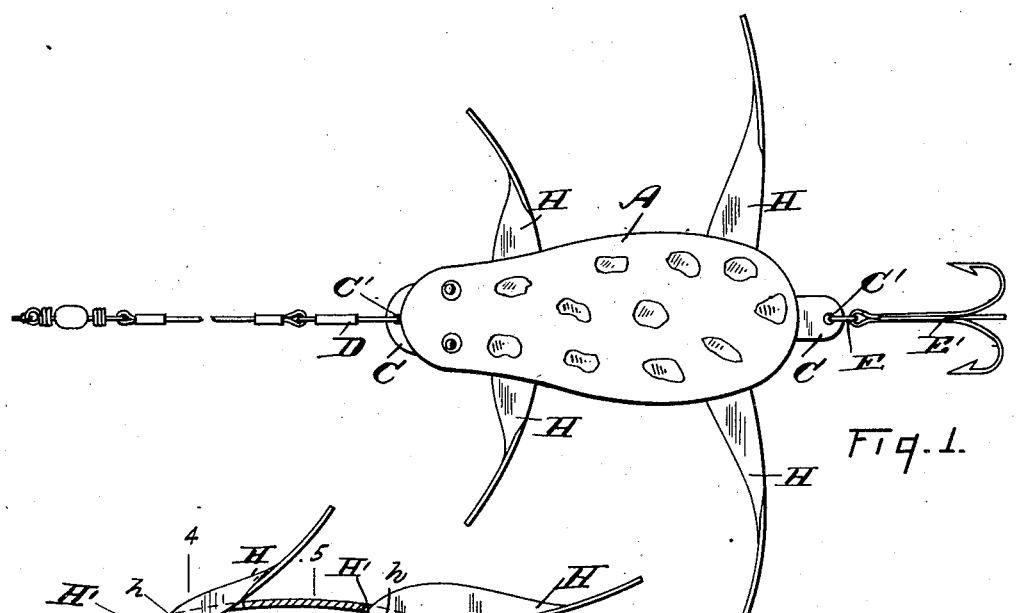
Figure 1 is a plan view of the lure, showing its movable members, representing the "legs" of the frog, in their initial position.
Figure 2:
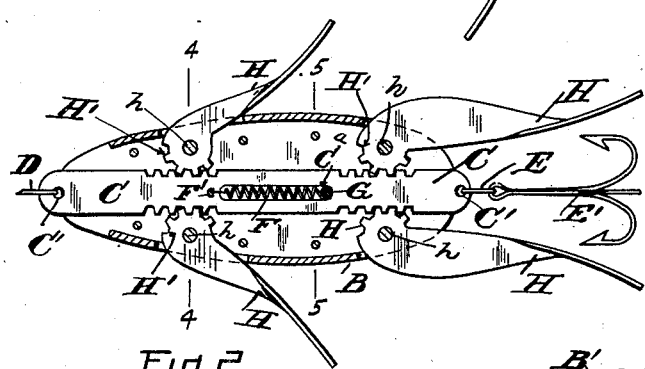
Figure 2 is a plan and horizontal sectional view of the device, disclosing the mechanism controlling the operation of the "legs",— with the latter at the limit of their rearward movement.
Figure 3:
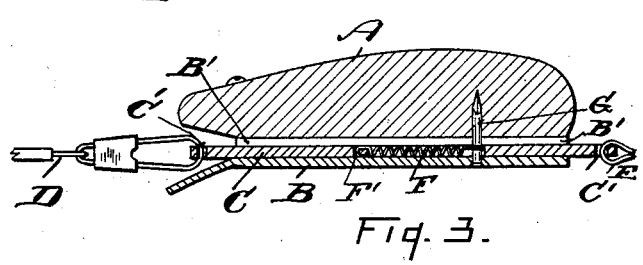
Figure 3 is a vertical longitudinal sectional view.

At the front and rear ends of the rack-bar is an aperture $C^1$,—and attached to it at the forward end is a suitable safety snap and swivel D, to which the usual fish line is secured. At the rear end of the rack-bar is engaged a link E, to which is secured a group of hooks $E^1$, see Figures 1 and 2.

F indicates a coil spring, lodged in a slot $C^a$ formed in the movable rack-bar C, having one end secured to the rack-bar through an aperture $F^1$, the other end being engaged to a pin G, extending upwardly through the plate B into the body of the device.

H denotes two pair of swinging members representing the legs of a frog, the free ends of said members being bent at an angle to the body portion to form blades which upon drawing the device through the water cause the legs to move back and forth due to the resistance of the water, and the action of the spring F, which operates to return the legs to their initial position.

The opposite end of each leg is formed with a segmental gear $H^1$, pivoted upon the respective pins $h$, extending through the plate B into the body of the device.

The teeth of the segmental gears of the respective swinging members mesh with the teeth on each side of the rack bar C, and through the resistance of the water and the action of the spring, the members H are caused to swing back and forth as the angler pulls and releases the line connected with the lure as the line is wound upon the reel, thus causing the legs to move back and forth through the water as will be readily understood.

It will also be noted that the projecting forward end of the rack-bar, as it moves in and out produces a very life-like appearance, as that of a live frog when extending his tongue to capture flies.

Having thus described my invention, what I claim is:

1. In a fish lure, a body portion; a rack-bar extending longitudinally through the device; a plurality of swinging members pivoted therein, each member having a segmental gear at one end in mesh with the rack-teeth of the bar, the free ends of said swinging members extending through openings in the side walls of the device, the ends being bent whereby they may encounter the resistance of the water when submerged; means for securing a hook to one end of the rack-bar; means attached to the other end of said rack-bar, whereby said rack-bar and the swinging members may be shifted in one direction; and a spring, to return said rack-bar and swinging members to their initial position when released from control of said last named means.

2. In a fish lure, a body portion formed of buoyant material; a sheet metal plate having return bends overlapping the body of the plate but spaced therefrom; means for attaching said metal plate to the body portion; a slidable rack-bar lodged between the spaced walls of the sheet metal plate, extending longitudinally through the device; means for attaching a hook to one end of said rack-bar; means to be attached to the other end of said rack-bar, whereby the rack-bar may be shifted in relation to the body of the device; a spring attached to the rack-bar for automatically returning said rack-bar to its initial position; a plurality of swinging members pivoted within the walls of the plate provided at one end with segmental gears respectively in mesh with the teeth of the rack-bar, the free ends of said swinging members extending beyond the walls of the device that they may encounter the resistance of the water when in use.

3. In a fish lure, a body portion formed of buoyant material, a sheet-metal plate bent longitudinally to overlap the body of the plate but spaced therefrom to receive a slidable bar; means for attaching the metal plate to the body portion; a slotted slidable rack-bar extending longitudinally through the device between the spaced walls of the sheet metal plate; means for attaching a plurality of hooks to one end of said rack-bar; means for attaching a fish line to the other end of said rack-bar, whereby the rack-bar may be manually shifted longitudinally in relation to the body of the device; a spring lodged in the slot formed in said rack-bar with one end attached to a pin extending through the sheet metal plate and rack-bar, the other end of said spring being attached to the rack-bar; a plurality of swinging members pivoted between the walls of the sheet metal plate, having at one end segmental gears in mesh with the teeth of the rack bar, the free ends of said swinging members extending through slots in said plate with the ends of the swinging members bent at right angles to the body portion thereby offering greater resistance to the water in which the device is submerged.

In testimony whereof, I sign this specification.

HERMAN OTTO KUEHN.